July 12, 1938.  D. A. McNAUGHTON  2,123,788
KEY SEATING ATTACHMENT FOR LATHES
Filed March 6, 1937   2 Sheets-Sheet 1
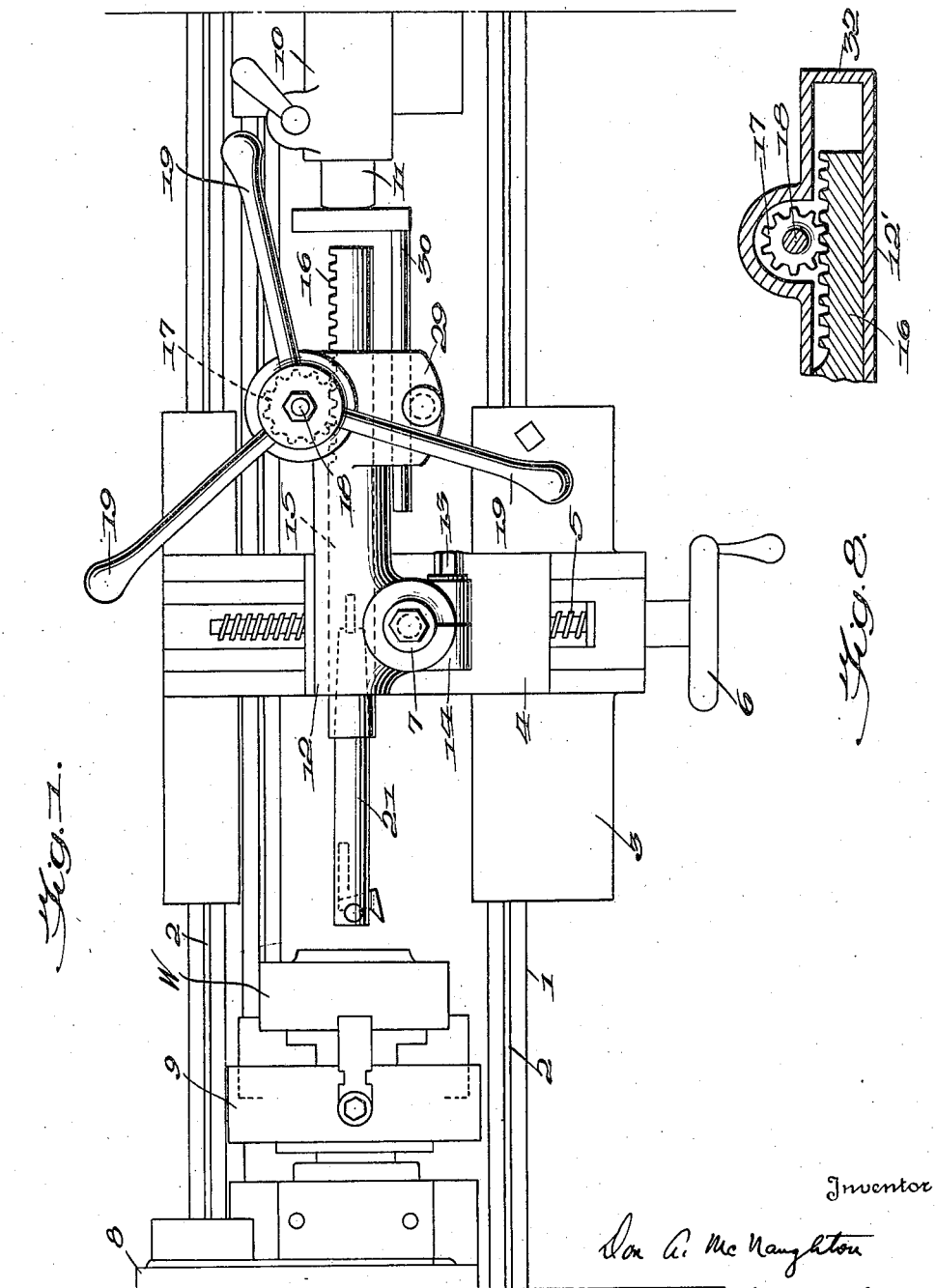
Inventor
Don A. McNaughton
By Cyrus Kehr & Swecker
his Attorneys

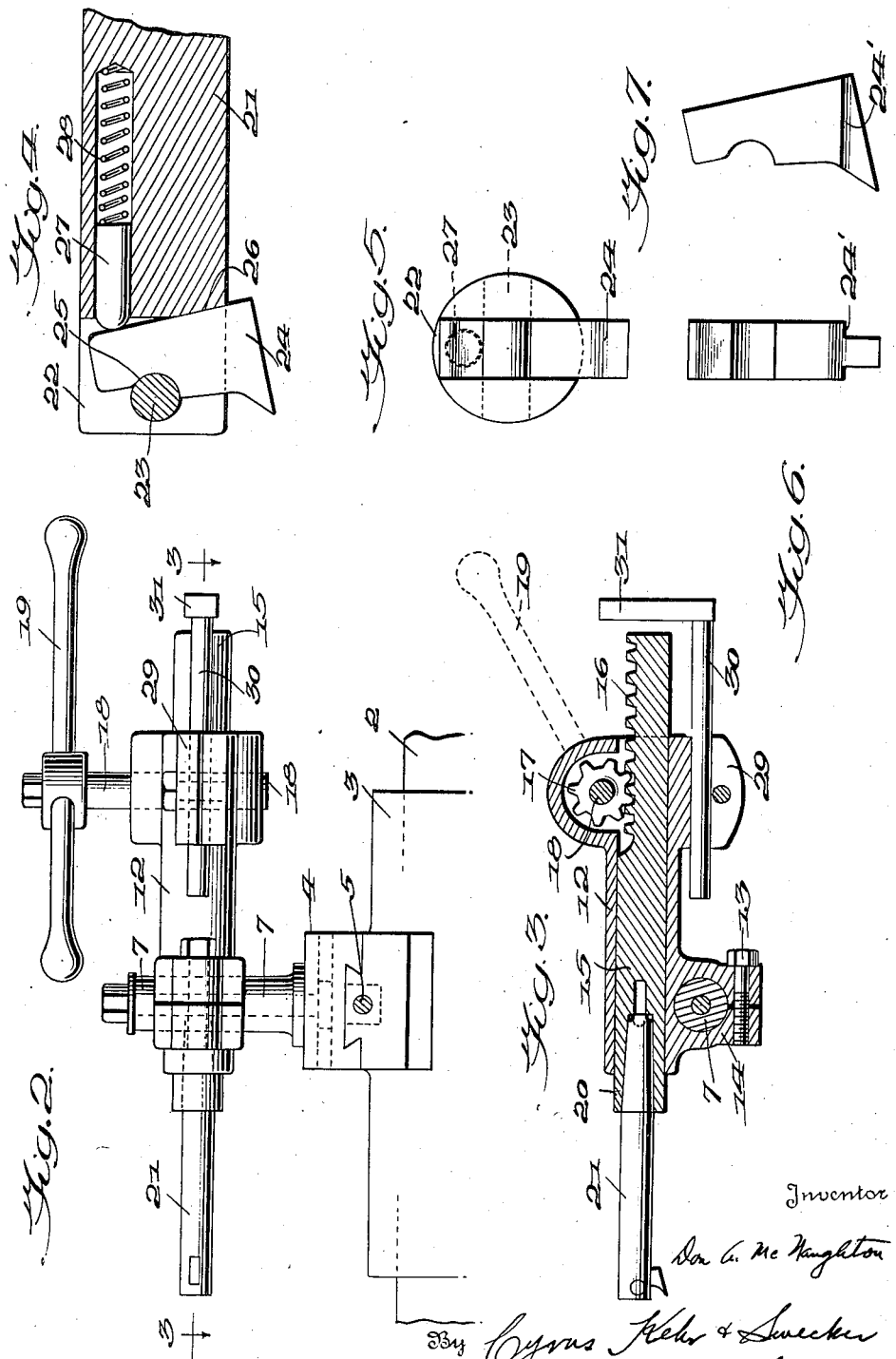

Patented July 12, 1938

2,123,788

UNITED STATES PATENT OFFICE 2,123,788

KEY SEATING ATTACHMENT FOR LATHES

Don A. McNaughton, Knoxville, Tenn.

Application March 6, 1937, Serial No. 129,461

7 Claims. (Cl. 90—41)

This invention relates to an improvement in key-seating attachments for lathes, for cutting a key-way or key-seat in work bored or chucked in a machine before removal from the lathe.

Heretofore, the only method employed for cutting a key-seat in work in a lathe was to "pump" or hand crank the carriage of the lathe back and forth, while the spindle and work were held from rotation, using a boring tool, having a cutter set to cut as it was forced into the work. While this has been done in emergencies, it is not practical because on small lathes the feed gearing and slide-rest are too light and on large lathes the carriage is too hard to move. In either case, the carriage binds and requires much power to overcome this binding. This is because the cutter is positioned near the center of the lathe and several inches above the V-slides, while the power to move it has to be applied through rack and pinion located in front of the bed and well below the V slides on which the carriage moves.

The object of this invention is to provide a practical and relatively inexpensive attachment which may be applied to the work, while it is held in the lathe for cutting of a key-way therein with least loss of power and with proper centering of the key-way cutter bar substantially co-incident with the center of the lathe spindle. The cutter bar has provision for practical and effective reciprocation thereof, while the cutter is fed into the work on the usual work rest on the lathe. An abutment takes the end thrust of the attachment on the cutting stroke.

The cutter bar has a cutter connected therewith, so as to be relieved automatically on the back stroke or idle stroke of the cutter bar, and this connection also permits ready detachment of the cutter from the cutter bar, as when it is desirable to substitute another cutter or a cutter of a different width therefor.

A preferred embodiment of this invention is illustrated in the accompanying drawings in which:

Fig. 1 is a top plan view of a lathe showing the attachment applied thereto;

Fig. 2 is a side elevation of the attachment and a portion of the lathe;

Fig. 3 is a horizontal sectional view through the attachment, substantially on the line 3—3 of Fig. 2;

Fig. 4 is a longitudinal sectional view through an end of the cutter bar showing the cutter in place therein;

Fig. 5 is an end elevation of the cutter bar;

Fig. 6 is an edge view of a modified form of cutter;

Fig. 7 is a side elevation thereof; and

Fig. 8 is a longitudinal sectional view through an end portion of the housing showing a slight modification thereof.

This invention is shown as applied to a lathe of usual construction having a bed 1, with V-guides 2 thereon, for the usual carriage 3. A cross slide tool rest 4 is mounted on the carriage 3 for transverse adjustment by a screw 5, operated by a hand wheel 6. The tool rest 4 has a tool post 7, extending upwardly therefrom to receive and mount the attachment. The lathe has the usual head stock 8, provided with a chuck 9 to receive the work which is designated generally W, and which is held in place in the chuck. The tail stock of the lathe is designated 10 and is provided with the usual tail stock spindle 11, adapted for longitudinal adjustment and to be locked in an adjusted position.

The attachment comprising this invention has a housing 12, mounted on the tool post 7, as shown in Figs. 2 and 3, where it is adjustable vertically and is adapted to be locked in an adjusted position by a clamp screw 13, extending through the sides of a split clamp 14, which embraces the tool post 7.

The housing 12 slidably receives a rack bar 15, one end of which is provided with a rack 16, arranged to mesh with a pinion 17, journaled in a fixed relation in the housing 12, being mounted on a shaft 18 extending transversely therethrough, which shaft 18 has a windlass lever 19 fixed thereon for rotating the shaft and pinion to feed the rack bar longitudinally relative to the housing.

The opposite end of the rack bar 15 from the rack 16 is formed with a socket 20, in position to receive one end of a cutter bar 21, which extends longitudinally from the rack bar 15 into position to enter the work W, for cutting a key-seat therein. As shown in Figs. 4 and 5, the extreme outer end of the cutter bar 21, has a transverse slot 22 therein with a pin 23, extending across said slot to receive and hold a cutter 24 therein. The cutter 24 extends transversely from a side of the cutter bar 21 and has its shank extending into the slot 22. The forward edge of the cutter shank is notched at 25 to fit the surface of the pin 23, so that said cutter may swing on the pin. The forward end of the cutter bar 21 has a bearing surface 26, in position to engage the back edge of the cutter shank adjacent the cutting end thereof, while the opposite end of the cutter shank has a bearing plug 27 pressed thereagainst by a spring 28, housed in the cutter bar 21. Thus the cutter is held normally in the position shown in Fig. 4, on the cutting stroke with the back edge of its shank against the bearing surface 26, while the notch 25 is held around the pin 23 by the spring-pressed bearing plug 27, thus preventing accidental displacement of the cutter. At the same time, this permits the cutter to swing bodily around the pin 23, on the back stroke of the cutter bar, against the tension of the spring 28, to relieve the cutter and pressure on the work during such back stroke. At the same time, the cutter is readily detachable by turning it slightly in a clockwise direction in Fig. 4, around the pin 23, and then withdrawing it transversely of the cutter bar, the spring 28 yielding sufficiently for ready removal of the cutter and the substitution of another cutter, as, for instance, the cutter 24' in Fig. 6, or vice-versa, where it is desired to cut key-ways of different widths or the substitution of a sharpened cutter, or for other purposes.

At the opposite end of the housing 12 from the cutter bar 21, provision is made preferably for abutting against the tail stock spindle 11, either by separate abutment, as shown in Figs. 1, 2 and 3, or by an integral abutment wall, as shown in Fig. 8, or other suitable abutting means for the purpose.

In the form shown in Figs. 1 to 3, the housing 12 has a clamp 29 thereon, opposite the pinion 17, receiving a rod 30, which is secured to the housing 12 by the clamp 29, and which rod 30 extends lengthwise of the housing and carries an abutment 31 on the outer end thereof, in position for engagement by the tail stock spindle 11, as shown in Fig. 1.

In the slight modification shown in Fig. 8, the housing 12' is extended beyond the rack and has a closed end wall 32, which forms an abutment for the tail stock spindle, serving to hold the attachment in place and take the end thrust of the cutter.

This construction provides for the application of uniform power by the rack and pinion on the cutter without any appreciable loss in power or variation therein, as would be provided by a crank or eccentric. The windlass lever 19, rotating its pinion 17, gives a straight line push to the rack bar and cutter bar which is easily sufficient to drive the cutter through the work. Only a few strokes are required to cut a key-seat to a standard depth. Ease of operation with increased efficiency is accomplished by having the cutter of the relieving type described above, whereby it is seated solidly when cutting and is free to pull itself clear of the work on the return stroke.

At the same time, provision is made for quick changing of cutters when desired merely by pulling one out laterally and inserting another, and yet the cutter is automatically and effectively locked in place in working position. The same spring that holds the cutter in its position in the bar provides the flexible action which the cutter needs for relief on the return stroke.

For instance, if it is desired to cut a key-way of one-half inch, and if the power of the attachment is only sufficient for practical cutting of a one-fourth inch key-way, the one-fourth inch cutter is inserted in the cutter bar and used to cut a one-fourth inch key-way in the work, and, thereafter, one-half inch cutter is substituted for the one-fourth inch, and then the cutting operation repeated to enlarge the one-fourth inch key-way to one-half inch size. This changing of cutters is made practical by this invention which provides for quick detachment and attachment of the cutters to the cutter bar.

It will be evident that the attachment should be adjusted preferably on the tool post 7 to the proper height of the center of the work W, and then the cutter is fed transversely into the work during or alternating with reciprocating movement of the cutter bar by the tool rest 4, which carries the post and which is moved transversely of the carriage 3, by the screw 5 and hand wheel 6. This supporting of the attachment on the tool post 7 also permits the slight turning of the housing at an angle to the center line of the lathe for the cutting of tapered key-seats which may be as readily cut as straight key-ways, if desired.

It is also possible to use this attachment in a lathe as a combined boring or key-seating attachment by inserting a boring tool or boring cutter bar in the socket 20 of the rack bar 15 to bore the hole in the work, and then without changing the set-up otherwise, this boring cutter bar may be replaced by the key-seat cutter bar for cutting the key-way in the work, thereby finishing the work practically in one operation. This would be particularly advantageous when a number of identical pieces are to be bored and key-seated successively without removing the attachment from the lathe.

While the connection described above between the cutter and cutter bar is preferable and possesses advantages, yet other forms of connection may be used for simpler construction or cheaper manufacturing, if desired, as for instance a fixed connection, or a simple form of non-relieving cutter.

I claim:

1. In a shaping attachment for lathes, the combination of a reciprocative cutter bar adapted to remove surplus material to a desired depth by successive strokes, a housing for said cutter bar, a rack connected with said cutter bar, and a pinion carried by the housing and fixed relative thereto and meshing with the rack to operate the cutter bar, and means for mounting said attachment for bodily vertical adjustment to conform to the center line of the lathe.

2. In a lathe, the combination with a spindle and tool post, of a cutter bar, means for adjustably mounting said cutter bar on the tool post for vertical adjustment relative thereto to conform to the center line of the lathe spindle, and means for reciprocating said cutter bar.

3. In a lathe, the combination with a spindle and a tool rest, of a key-seating attachment for said lathe including an attachment, means for mounting said cutter bar on the tool rest for adjustment vertically relative thereto toward and from the center line of the lathe spindle, and means for reciprocating said cutter bar.

4. In a lathe, the combination with a spindle and a tool post, of a cutter bar, means for mounting said cutter bar on the tool post for adjustment vertically relative thereto toward and from the center line of the lathe spindle, means for reciprocating said cutter bar, and means substantially on the center line of the lathe spindle for abutting the mounting means to hold said mounting means against endwise movement.

5. In a lathe, the combination with a tool post, of a housing mounted on the tool post, a cutter bar slidably mounted in the housing and extending from an end thereof, means for reciprocating said cutter bar, said housing having a stationary abutment at the opposite end thereof from the cutter bar, and abutting means externally of the housing and substantially on the center line of the cutter bar in position to engage said stationary abutment to take the end thrust of the cutting bar.

6. In a key-seat attachment for a lathe, a reciprocative cutter bar, a pin attached to the cutter bar, a cutter having a shank with a notch therein, detachably engaging the pin for quick detachment of the cutter from the cutter bar, and resilient means acting on the cutter holding the same in engagement with the pin, said resilient means permitting swinging of the cutter to relieve the same on backward stroke of the cutter bar.

7. In a key-seat attachment for a lathe, a reciprocative cutter bar having a pin, a cutter having a shank extending transversely of the cutter bar, said shank having a notch in a side thereof detachably engaging the pin for quick detachment of the cutter from the cutter bar, and spring-pressed means in position to press against the end portion of the shank at the opposite end from the cutter and on the opposite side from the notch.

DON A. McNAUGHTON.

CERTIFICATE OF CORRECTION.

Patent No. 2,123,788.　　　　　　　　　　　　　　　July 12, 1938.

DON A. McNAUGHTON.

It is hereby certified that error appears in the printed specification of the above numbered patent requiring correction as follows: Page 2, second column, line 58, claim 3, for the words "an attachment" read a cutter bar; and line 59, for "cutter bar" read attachment; and that the said Letters Patent should be read with this correction therein that the same may conform to the record of the case in the Patent Office.

Signed and sealed this 11th day of October, A. D. 1938.

Henry Van Arsdale

(Seal)　　　　　　　　　　　　　　　　　　Acting Commissioner of Patents.